US008572451B2

(12) United States Patent  
Aghili et al.

(10) Patent No.: US 8,572,451 B2
(45) Date of Patent: Oct. 29, 2013

(54) METHOD AND APPARATUS FOR INDICATING A TEMPORARY BLOCK FLOW TO WHICH A PIGGYBACKED ACK/NACK FIELD IS ADDRESSED

(75) Inventors: Behrouz Aghili, Melville, NY (US); Stephen G. Dick, Nesconset, NY (US); Marian Rudolf, Montreal (CA); Prabhakar R. Chitrapu, Blue Bell, PA (US)

(73) Assignee: InterDigital Technology Corporation, Wilmington, DE (US)

( * ) Notice: Subject to any disclaimer, the term of this patent is extended or adjusted under 35 U.S.C. 154(b) by 1184 days.

(21) Appl. No.: 12/133,593

(22) Filed: Jun. 5, 2008

(65) Prior Publication Data
US 2008/0307284 A1  Dec. 11, 2008

Related U.S. Application Data

(60) Provisional application No. 60/942,370, filed on Jun. 6, 2007.

(51) Int. Cl.
*H04L 1/16* (2006.01)
*H03M 13/00* (2006.01)
(52) U.S. Cl.
USPC ........... 714/748; 714/749; 714/750; 714/751; 370/252; 370/328; 370/329; 370/346; 370/449; 370/473
(58) Field of Classification Search
None
See application file for complete search history.

(56) References Cited

U.S. PATENT DOCUMENTS

| 6,557,135 B1 | 4/2003 | Balachandran et al. |
| 7,889,755 B2 | 2/2011 | Malladi et al. |
| 2002/0170013 A1 | 11/2002 | Bolourchi et al. |

(Continued)

FOREIGN PATENT DOCUMENTS

| EP | 0 186 343 | 7/1986 |
| GB | 2 379 144 | 2/2003 |
| GB | 2 387 303 | 10/2003 |
| WO | 02/32168 | 4/2002 |

OTHER PUBLICATIONS

Third Generation Partnership Project, "Technical Specification Group GSM/EDGE Radio Access Network General Packet Radio Service (GPRS); Mobile Station (MS)—Base Station System (BSS) interface; Radio Link Control/Medium Access Control (RLC/MAC) protocol (Release 7)," 3GPP TS 44.060 V7.12.0, (Mar. 2008).

(Continued)

Primary Examiner — Albert Decady
Assistant Examiner — Justin R Knapp
(74) Attorney, Agent, or Firm — Volpe and Koenig, P.C.

(57) ABSTRACT

A method and apparatus for indicating a temporary block flow (TBF) to which a piggybacked acknowledgement/non-acknowledgement (PAN) field is addressed are disclosed. A sequence may be generated from a temporary flow identity (TFI) to which the PAN field is addressed and masked with a PAN check sequence (PCS). A radio block including a PAN field and a masked PCS is transmitted. The PCS may be masked with one of TFIs which is selected in accordance with a rule pre-agreed. A secondary identifier may indicate a TBF to which the PAN field is addressed. A special value may be used to represent all TBFs assigned and a secondary identifier may indicate a TBF to which the PAN field is addressed. A special value on the PAN field may be used for control purposes for indicating an action affecting a group of receiving stations listening to the radio block.

18 Claims, 3 Drawing Sheets

(56) References Cited

U.S. PATENT DOCUMENTS

2002/0186675 A1 12/2002 Otting et al.
2006/0291403 A1 12/2006 Kahtava et al.
2008/0056303 A1* 3/2008 Sebire et al. .................. 370/474

OTHER PUBLICATIONS

Third Generation Partnership Project, "Technical Specification Group GSM/EDGE Radio Access Network; Feasibility study for evolved GSM/EDGE Radio Access Network (GERAN) (Release 7)", 3GPP TR 45.912, V7.1.0, (Feb. 2007).

Third Generation Partnership Project, "Technical Specification Group GSM/EDGE Radio Access Network; Channel coding (Release 7)", 3GPP TS45.003 V7.1.0, (Feb. 2007).

Third Generation Partnership Project, "Technical Specification Group GSZM/EDGE Radio Access Network; Channel coding (Release 7)", 3GPP TS 45.003 V7.1.0, (Feb. 2007).

Third Generation Partnership Project, "Technical Specification Group GSM/EDGE Radio Access Network; Feasibility study for evolved GSM/EDGE Radio Acces Network (GERAN) (Release 7)", 3GPP TR 45.912, V7.1.0, (Nov. 2006).

Third Generation Partnership Project, "Technical Specification Group GSM/EDGE Radio Access Network; General Packet Radio Service (GPRS); Mobile Station (MS)—Base Station System (BSS) interface; Radio Link Control/Medium Access Control (RLC/MAC) protocol (Release 7)," 3GPP TS44.060 V7.8.0, (Mar. 2007).

Huawei, "Discussion on Fast Ack/Nack Report," 3GPP TSG GERAN #33, Tdoc GP-070172, Seoul, Korea (Feb. 12-16, 2007).

Interdigital, "Indication of TBF identity in PAN," 3GPP TSG GERAN #34, Tdoc: GP-070602 (May 14-18, 2007).

Rohde & Schwarz et al., "Test Case 34.x: Insufficient Handling of SMS Timer TC1M", Change Request, 51.010-1 CR 3764, Current Version 7.4.0, 3GPP TSG-GERAN Meeting #33, GP-070078, (Seoul, Korea, Feb. 13-15, 2007).

Third Generation Partnership Project, "Technical Specification Group GSM/EDGE Radio Access Network; Feasibility study for evolved GSM/EDGE Radio Access Network (GERAN) (Release 7)", 3GPP TR 45.912, V7.0.0, (Sep. 2006).

Third Generation Partnership Project, "Technical Specification Group GSM/EDGE Radio Access Network; Feasibility study for evolved GSM/EDGE Radio Access Network (GERAN) (Release 7)", 3GPP TR 45.912, V7.1.0, (Nov. 2006).

Third Generation Partnership Project, "Technical Specification Group GSM/EDGE Radio Access Network; Feasibility study for evolved GSM/EDGE Radio Access Network (GERAN) (Release 7)", 3GPP TR 45.912, V7.2.0, (Feb. 2007).

Third Generation Partnership Project, "Technical Specification Group GSM/EDGE Radio Access Network; Channel coding (Release 7)", 3GPP TS 45.003 V7.1.0, (Feb. 2007).

Third Generation Partnership Project, "Technical Specification Group GSM/EDGE Radio Access Network; Channel coding (Release 7)", 3GPP TS 45.003 V7.4.0, (Feb. 2008).

Third Generation Partnership Project, "Technical Specification Group GSM/EDGE Radio Access Network; General Packet Radio Service (GPRS); Mobile Station (MS)—Base Station System (BSS) interface; Radio Link Control/Medium Access Control (RLC/MAC) protocol (Release 7)," 3GPP TS 44.060 V7.8.0, (Mar. 2007).

Third Generation Partnership Project, "Technical Specification Group GSM/EDGE Radio Access Network; General Packet Radio Service (GPRS); Mobile Station (MS)—Base Station System (BSS) interface; Radio Link Control/Medium Access Control (RLC/MAC) protocol (Release 7)," 3GPP TS 44.060 V7.12.0, (Mar. 2008).

Third Generation Partnership Project, "Technical Specification Group GSM/EDGE Radio Access Network; General Packet Radio Service (GPRS); Mobile Station (MS)—Base Station System (BSS) interface; Radio Link Control/Medium Access Control (RLC/MAC) protocol (Release 8)," 3GPP TS 44.060 V8.0.0, (Mar. 2008).

* cited by examiner

METHOD AND APPARATUS FOR INDICATING A TEMPORARY BLOCK FLOW TO WHICH A PIGGYBACKED ACK/NACK FIELD IS ADDRESSED

CROSS REFERENCE TO RELATED APPLICATION

This application claims the benefit of U.S. provisional application No. 60/942,370 filed Jun. 6, 2007, which is incorporated by reference as if fully set forth.

FIELD OF INVENTION

The present invention is related to wireless communications.

BACKGROUND

Latency reduction is one of the well recognized work items in GSM/EDGE Release 7 radio access network (GERAN) evolution. There are primarily two techniques being worked on in this area; namely the reduced transmission time interval (RTTI) feature and the fast positive acknowledgement/negative acknowledgement (ACK/NACK) reporting (FANR) feature.

Both the RTTI feature and the FANR feature can either work separately, or in conjunction with each other. Furthermore, both the RTTI feature and the FANR feature can be used in conjunction with evolved general packet radio services (EGPRS) modulation and coding schemes MCS-1 to MCS-9 (except for MCS-4 and MCS-9 where FANR cannot be implemented) or with the novel Release 7 and beyond EGPRS-2 modulation and coding schemes DAS-5 to DAS-12, DBS-5 to DBS-12, UAS-7 to UAS-11 and UBS-5 to UBS-12. RTTI mode of operation and FANR mode of operation are also possible with other existing Release 7 GERAN evolution features, such as the Downlink Dual-Carrier (DLDC) feature or Downlink Advanced Receiver Performance (DARP) operation.

In the prior art described by pre-Release 7 global system for mobile communication (GSM), general packet radio services (GPRS) and EGPRS modes of operation, an ACK/NACK report was typically sent in explicit radio link control (RLC)/medium access control (MAC) protocol messages, also referred to as RLC/MAC control blocks. Examples for such explicit RLC/MAC protocol messages include Packet Downlink (DL) ACK/NACK or Packet Uplink (UL) ACK/NACK messages. The RLC/MAC control block is addressed to a certain radio resource, called a temporary block flow (TBF).

A TBF is a temporal connection between a mobile station and a network to support a uni-directional transfer of data. If supported by the mobile station and the network, more than one (1) TBF can be allocated to a mobile station. A TBF is temporary and maintained only for the duration of the data transfer. Each TBF is assigned a temporary flow identity (TFI) by the network. The TFI is unique among concurrent TBFs in each direction and is used instead of mobile station identity in the RLC/MAC layer. For example, in GPRS and EGPRS modes of operation, the same TFI is included in every RLC/MAC header belonging to a particular TBF in order to allow the intended receiver, (i.e., the wireless transmit/receive unit (WTRU) or network), to determine the addressee of a received radio block.

In order to reduce transmission latencies associated with the use of an entire RLC/MAC control block, it has been proposed in GSM/(E)GPRS Release 7 to send the ACK/NACK report for a certain TBF "piggybacked" onto an RLC/MAC data block by puncturing a number of bits from the channel-coded data portion of the radio block at no loss of data. This new field is inserted, when needed, into the RLC/MAC data block and carries the ACK/NACK report as part of the radio block referred to as a piggybacked ACK/NACK (PAN) field. The insertion of PAN is possible, and can be configured, both for the DL and UL directions. The PAN field, when sent to a WTRU in the DL, carries ACKs or NACKs for data units or protocol data units (PDUs) previously sent by the WTRU in the UL direction, and vice versa. The presence or absence of the PAN field in a radio block is indicated by the RLC/MAC header, either by a bit or bit field setting, or by setting other code points depending on the RLC/MAC header type accordingly, and therefore depends on the EGPRS/EGPRS-2 modulation and coding scheme chosen for the transmission of the radio block. In the DL direction, the PAN field of an RLC/MAC data block can possibly be addressed to a WTRU that is not the intended receiver of the data units (or PDUs) in the radio block. Alternatively, the PAN field and the data units (or PDUs) of the radio block can be intended for the same WTRU. Both for DL and UL directions, the TBF to which the PAN field refers can possibly be different from the TBF corresponding to the data units (or PDUs) of the radio block, even if the receiver is the same physical unit (WTRU, or network).

The actual bit field(s) carrying the ACKs or NACKs in the PAN field can be encoded according to different procedures, for example using a starting sequence number (SSN)-based approach or a time-based approach.

Since the PAN field is included in a data block that may be addressed to a different TBF, it is necessary to identify to which TBF the PAN field is addressed. In addition, a need for additional methods for PAN transmission and reception modes arises from additional operation scenarios in GSM/(E)GPRS networks. For example, identification of the TBF to which the PAN is addressed should also be possible in the case of multiple TBFs assigned to one (1) receiver, such as one WTRU. This mode of operation is needed to facilitate multiple TBFs mode of operation with FANR.

PAN transmissions may be made for special cases, such as when a PAN field not actually addressed to a TBF is sent. This mode of operation is needed to facilitate transmission and reception of a PAN field not pertaining to data units (or PDUs) and their associated TFI(s). PAN transmissions may also be made where a PAN is to be addressed and to be reliably decoded by more than one receiver. For example, this mode of operation is needed when the PAN is sent to a group of receivers. Therefore, methods are sought after that allow for such modes of operation.

SUMMARY

A method and apparatus for indicating a TBF to which a PAN field is addressed are disclosed. A sequence may be generated from a TFI to which the PAN field is addressed and used to mask a PAN check sequence (PCS) derived from the PAN field. The length of the PCS may be larger than the length of the TFI. For example, the PCS may be N3=10 bits while the TFI may be N2=5 bits. A radio block including the PAN field and the masked PCS is then transmitted. The sequence may be generated by using Reed-Muller coding, cyclic redundancy check (CRC) encoding, convolutional coding, pseudo noise generation, table mapping, or the like. The PCS may be masked with one of a plurality of TFIs which is selected in accordance with a pre-agreed or deterministic rule. An identifier may indicate a TBF to which the PAN field is addressed. In addition, either one or more special value(s) for the identifier may be chosen. A special or selected identifier chosen to generate the PCS in a radio block may represent all TBFs assigned to receiving station(s), or it may represent actions affecting more than one receiving stations decoding a radio block, or it may be used to simplify PAN encoder and decoder operation.

BRIEF DESCRIPTION OF THE DRAWINGS

A more detailed understanding may be had from the following description, given by way of example in conjunction with the accompanying drawings wherein.

DETAILED DESCRIPTION

When referred to hereafter, the terminology "WTRU" includes but is not limited to a user equipment (UE), a mobile station, a fixed or mobile subscriber unit, a pager, a cellular telephone, a personal digital assistant (PDA), a computer, or any other type of user device capable of operating in a wireless environment. When referred to hereafter, the terminology "Node-B" includes but is not limited to a base station, a site controller, an access point (AP), or any other type of interfacing device capable of operating in a wireless environment.

Embodiments disclosed herein are applicable to any wireless communication system including GERAN evolution, etc.

Figure 1:
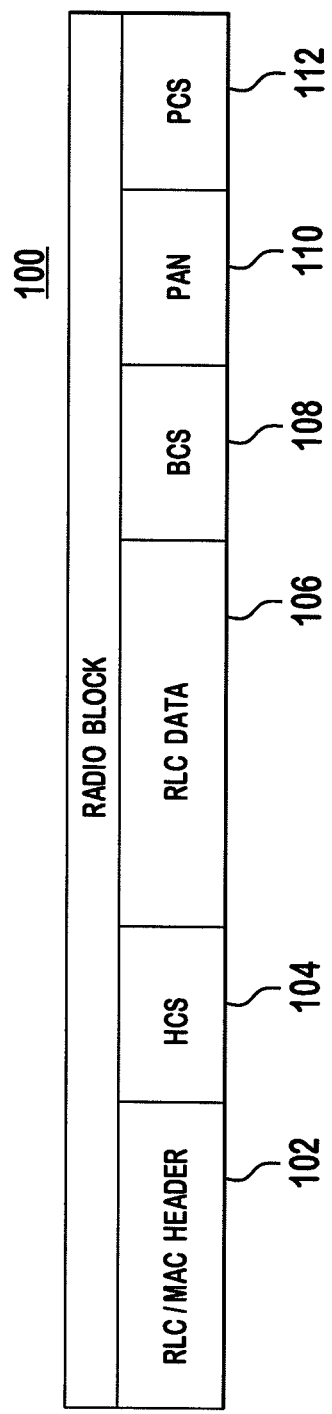
FIG. 1 shows an example radio block.

FIG. 1 shows an example radio block 100. The radio block 100 for data transfer includes one RLC/MAC header 102, a header check sequence (HCS) 104, one or more RLC data block(s) 106, a block check sequence (BCS) 108, a PAN field 110, and a PCS 112. The RLC/MAC header 102, the RLC data block(s) 106 and the PAN field 110 are coded separately for error detection and correction, and a separate checksum, (e.g., a cyclic redundancy check (CRC) checksum), is attached to each of them. The RLC/MAC header 102 contains a control field indicating whether a PAN field 110 is included or not in the radio block 100. The HCS 104 is used for error detection of the RLC/MAC header 102. The BCS 108 is used for error detection of the RLC data block 106. A separate BCS may be included for each RLC data block. The PAN field 110 contains piggy-backed ACK/NACK information sent in one direction to provide acknowledgement for a TBF in the other direction. The PCS 112 is used for error detection and for receiver identification of the PAN field 110.

Since the PAN field is included in a data block that may be addressed to a different TBF, it is necessary to identify to which TBF the PAN field is addressed. One of the methods is generating a PCS which is a function of the PAN information bits and masking the PCS with a TFI value using an exclusive OR (XOR) operation. A transmitting station performs XOR operation of the calculated PCS with the TFI. A receiving station first calculates a PCS and performs XOR operation of the calculated PCS with its own TFI in order to make sure that the PAN field is addressed to it. An advantage of this technique is that the transmitter does not need to send TFI bits explicitly in the PAN field. Unlike the TFI of the intended receiving station of the radio block, which is explicitly included in the RLC/MAC header, the PCS is decoded by implicit knowledge of the TFI during the decoding process by the receiving station.

Without loss of generality, the TFI associated with a particular TBF that is used for addressing the intended receiving station of an RLC/MAC data or control block may be N1=5 bits long. Similarly, the TFI for the PAN field may also be N2=5 bits long. The PCS may be N3=10 bits long. As is obvious to someone skilled in the art, other choices for N1, N2 and N3 are possible, and the embodiments disclosed herein may equally be applied. If the N2 TFI bits are shorter than the PCS length, the TFI may be mixed only with the first or last N2 bits of the PCS. Alternatively, the N2 TFI bits may be mixed with a selected subset of N2 bits chosen amongst the N3 PCS bits, where N2<N3. For example, a subset of five (5) PCS bits b1, b5, b6, b9, b10 may be chosen amongst the available ten (10) PCS bits, b1, b2, b9, b10.

However, this approach has a disadvantage that, if two TFIs, (one used by the transmitting side and one used by the receiving side), are close to one another, (e.g., differ only in one bit value), there is an increased chance of mistaken acceptance. To overcome this problem, the N2 bits TFI, (e.g., N2=5 TFI), may first be mapped into an N bits sequence, and then masked, (i.e., XOR operation), with the PCS. N may be same as the length of the PCS. Alternatively, N may be chosen to be smaller than the PCS length.

Figure 2:
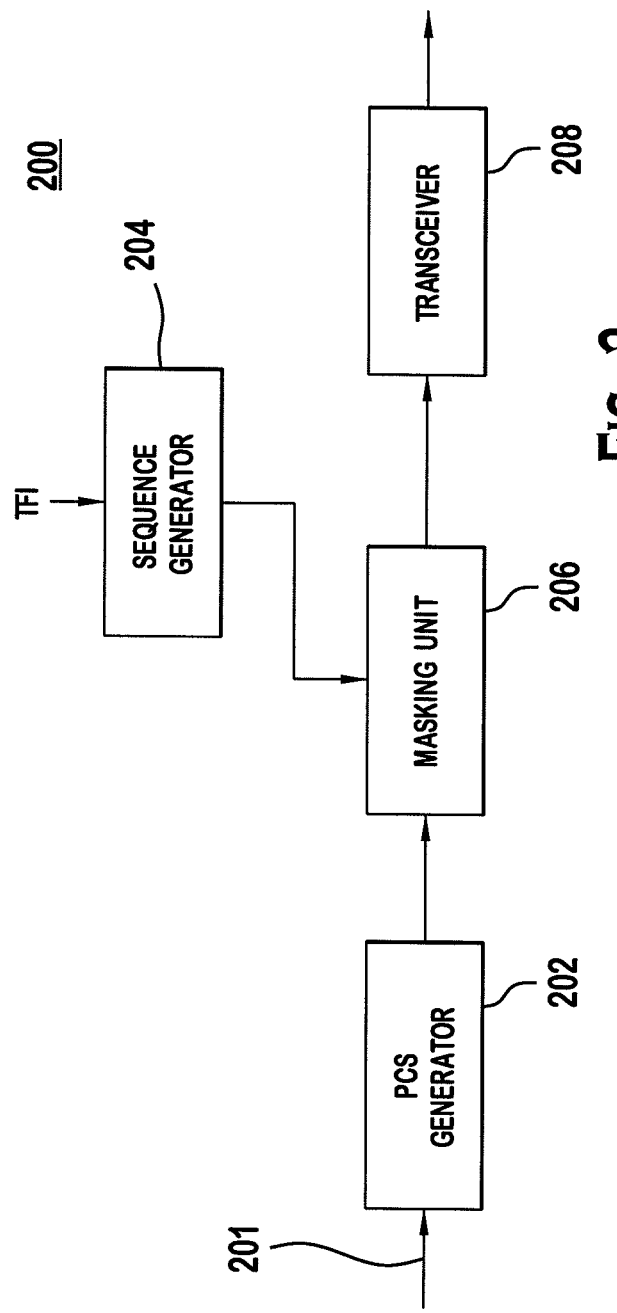
FIG. 2 is an example block diagram of a transmitting station.

FIG. 2 is an example block diagram of a transmitting station 200. The transmitting station 200 may be a WTRU, a Node-B, or any other apparatus or device. The transmitting station 200 includes a PCS generator 202, a sequence generator 204, a masking unit 206, and a transceiver 208. A PAN field is input into the PCS generator 202. The PCS generator 202 generates a PCS based on the PAN field 201. For example, the PCS generator 202 may be a cyclic redundancy check (CRC) encoder and the PCS may be a CRC checksum generated based on the PAN field. The sequence generator 204 generates an N-bit sequence from the N2-bit TFI. The masking unit 206 then masks the PCS with the N-bit sequence. The masking of the PCS bits with the sequence may be performed by modulo-2 addition, (i.e., an XOR operation). The transceiver 208 sends a data block including the PAN field and the masked PCS. With this scheme, a TFI may be transmitted in a PAN field without using explicit bits to identify the TBF. Before transmission, a channel coding, (such as forward error correction (FEC) coding, rate matching, interleaving, or the like), may be performed.

The sequence used for making the PCS may be as simple as using the sequence itself. For example, if the TFI is N2=5 bits and the PCS is N=11 bits then the prescribed procedure may be simply to modulo 2 add the first N2 bits of the PCS with the TFI, or the last N2 bits, or any predefined set of N2 bits within the N bits. Alternatively, the sequence may be generated in many different ways that maximize the difference, (i.e., Hamming distance), between pairs of resultant patterns. For example, assuming that N2=5 and N=11, the Reed-Muller (16,5) code may be used to generate a 16 bit sequence from the 5-bit TFI, and the 16 bit sequence may be truncated to 11 bits. Alternatively, the 5 bit TFI may be put through a CRC generator to create an 11 bit sequence. The 5 bit TFI may be put through a convolutional encoder to create an 11 bit sequence. The 5 bit TFI may be used as an input or an initial state to a pseudo noise (PN) generator, (such as a linear shift register sequence), to generate an 11 bit sequence. Alternatively, the 5 bit TFI may simply be repeated.

Alternatively, an 11×5 mapping table may be used to map the 5 bit sequence to an 11 bit sequence. The mapping table may be generated by a computer optimization algorithm. As example mapping matrix is as follows:

$$\begin{matrix} 1 & 0 & 0 & 0 & 1 & 1 & 0 & 0 & 0 & 1 & 0 \\ 0 & 1 & 0 & 0 & 1 & 0 & 1 & 0 & 0 & 1 & 0 \\ 0 & 0 & 1 & 0 & 1 & 0 & 0 & 1 & 0 & 1 & 0 \\ 0 & 0 & 0 & 1 & 1 & 0 & 0 & 0 & 1 & 1 & 0 \\ 0 & 0 & 0 & 0 & 0 & 1 & 1 & 1 & 1 & 1 & 1 \end{matrix}$$

For example, with this mapping matrix, the 5 bit TFI B={00011} maps into an 11 bit sequence R={00011111001}. This should result in a minimum Hamming distance of 4 between any pair of 11 bit sequences generated.

For the case of mapping the 5 bit TFI into 10 bits, the following (10,5) systematic coding produces minimum distance of 4:

$$\begin{matrix} 1 & 0 & 0 & 0 & 0 & 0 & 1 & 1 & 1 & 1 \\ 0 & 1 & 0 & 0 & 0 & 1 & 0 & 1 & 1 & 1 \\ 0 & 0 & 1 & 0 & 0 & 1 & 1 & 0 & 1 & 1 \\ 0 & 0 & 0 & 1 & 0 & 1 & 1 & 1 & 0 & 1 \\ 0 & 0 & 0 & 0 & 1 & 1 & 1 & 1 & 1 & 0 \end{matrix}$$

The best sequences may be defined as a set of 32 sequences, (in case that N2=5), that yield the largest minimum distance between the worst case pair.

The above scheme may be applied to any mapping where an N2 bit identifier is used to modify an N3 bit CRC, where N2<N3. If N2≥N3, only N3 bits of the identifier may be used to modify the CRC and the remaining (N3−N2) bits may be sent explicitly.

Figure 3:
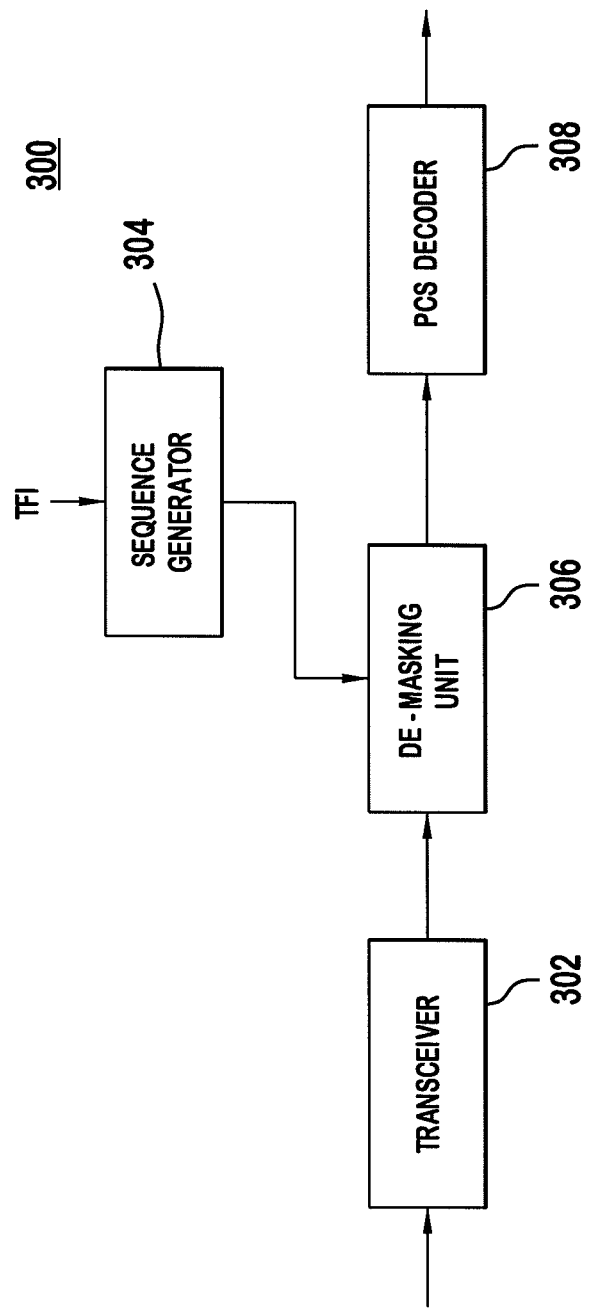
FIG. 3 is an example block diagram of a receiving station.

FIG. 3 is an example block diagram of a receiving station 300. The receiving station 300 may be a WTRU, a base station, or any other apparatus or device. The receiving station 300 includes a transceiver 302, a sequence generator 304, a de-masking unit 306, and a PCS decoder 308. The transceiver 302 receives a radio block including a PAN field and a masked PCS. The transceiver 302 outputs the PAN field and the masked PCS. The sequence generator 304 generates the sequence from the TFI assigned to the receiving station 300. The de-masking unit 306 de-masks the received masked PCS with the generated sequence. The de-masking unit 306 outputs PAN bits and de-masked PCS bits. The PCS decoder 308 then computes a PCS, (e.g., CRC bits), based on the received PAN field and compares the computed PCS with the de-masked received PCS. If the two PCSs agree, then the received PAN field is declared to be addressed to the receiving station 300. If the two PCSs do not agree, the PAN field is declared to be not addressed to the receiving station 300 and may be discarded.

Figure 4:
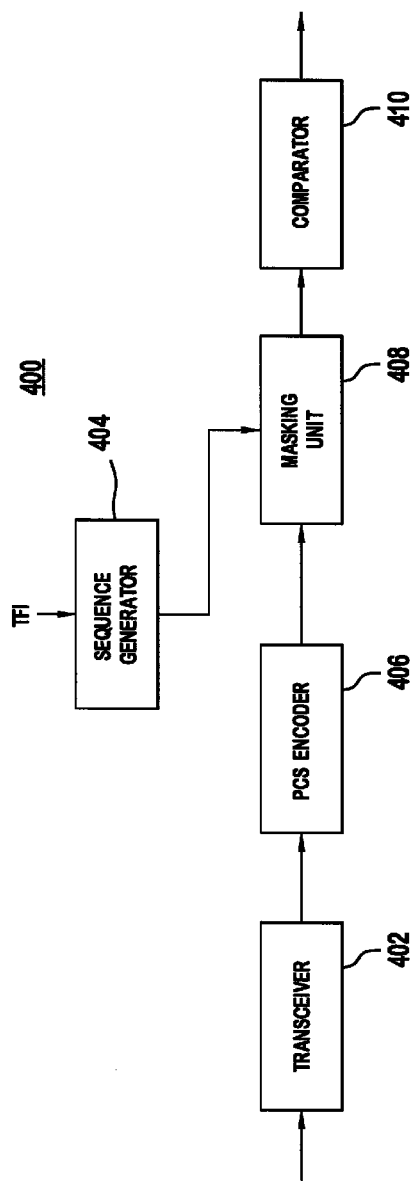
FIG. 4 shows an example block diagram of a receiving station in accordance with another embodiment.

Alternatively, the receive processing may be performed in a different way that is mathematically identical to the procedure above. FIG. 4 shows a receiving station 400 in accordance with this alternative. A transceiver 402 receives a radio block including a PAN field and a masked PCS. The transceiver 402 outputs the PAN field and the masked PCS. A sequence generator 404 generates the sequence from the TFI assigned to the receiving station 400. A PCS encoder 406 computes a PCS, (e.g., CRC bits), based on the received PAN field. A masking unit 408 masks the computed PCS with the generated sequence. A comparator 410 then compares the received PCS bits with the regenerated and masked PCS bits. If the two PCSs agree, then the received PAN field is declared to be addressed to the receiving station 400. If the two PCSs do not agree, the PAN field is declared to be not addressed to the receiving station 400 and may be discarded.

As an alternative embodiment, a rule-based scheme may be implemented between a transmitting station and a receiving station that determines which possible candidate TFI(s) can be used to compute the PCS depending on the occurrence of predetermined conditions. The determination which possible candidate TFI(s) can be used on either one or more occurrences of the PAN field may result in a restriction to either one (1) possible candidate TFI value, or to more than one TFI value but still less than a number of overall possible TFI values. Different conditions to limit or determine the possible TFI values are possible. For example, a dependence on frame numbers or timers or equivalent measures of timing in the GSM system, a dependence of previous events such as types of received radio blocks or signals, a dependence on other identifiers to be decoded in conjunction with the first identifier, etc. may be used.

A transmitting station and a receiving station may make a pre-agreement on which TFI that may be transmitted at any given time instant (i.e., in a particular downlink radio block). When a receiving station needs to test a received PAN field against more than one allocated TFI values, the receiving station determines a particular TFI to be tested at the given time instant based on the pre-agreed rule. For example, assuming that a receiving station has two allocated TBFs that result in two differently masked CRC values, the transmitting station and the receiving station may agree to employ TFI #1 in even-numbered radio frames, and TFI #2 in odd-numbered radio frames. Instead of testing against both TFI-masked CRC hypotheses per received PAN field, the receiving station may test with only one TFI value. This scheme may be extended for more than one TBF in a straightforward manner.

In accordance with another embodiment, the TBF number, (i.e., TFI), indicated through the PCS may be made dependent on another secondary identifier in the RLC/MAC data block. A transmitting station sends a radio block including the PAN field, the masked PCS, and a secondary identifier. The secondary identifier indicates a TBF to which the PAN field is addressed so that the receiving station needs to check only one TFI. For example, the secondary identifier may be placed into the RLC/MAC header to indicate that the intended receiver of the PAN is the same as the addressee of the data units (or PDUs) indicated by the TFI of the RLC/MAC header.

The receiving station first checks the secondary identifier when it is determined that the received radio block includes a PAN field to determine which TFI that the receiving station needs to check based on the secondary identifier. With this scheme, the receiving station needs to perform only one CRC test rather than multiple tests against all TFIs assigned to the receiving station. The secondary identifier may be an identifier used between the transmitting station and other receiving stations. For example, TFI m may only occur if a certain RLC/MAC header field or a PAN field is present in the RLC/MAC data block.

In accordance with another embodiment, a special or reserved value that represents all admissible TBFs allocated to a particular receiving station may be used to indicate to the receiving station the existence of a PAN field addressed to the receiving station. A transmitting station sends a radio block including a PAN field, a masked PCS derived using a special or reserved value, and a secondary identifier. The special or reserved value represents all TBFs assigned to the receiving station. The secondary identifier indicates a TBF to which the PAN field is addressed. The special value may be masked with the PCS. The secondary bit field may be a part of the header of the data block.

The receiving station receives a radio block including a PAN field and a masked PCS and detects the special or reserved value. Upon detection of the special value, the receiving station recognizes that the received radio block includes a PAN field addressed to the receiving station since the special value represents all TBFs assigned to the receiving station. The receiving station detects a secondary identifier indicating a TBF to which the PAN field is addressed. The receiving station then performs PCS decoding with the selected TFI based on the secondary identifier.

In accordance with still another embodiment, a special or reserved identifier value may be used on the PAN field to mask the PCS to indicate an action affecting a receiving station listening to a radio block, or it may be used to simplify PAN encoder and decoder operation. This scheme may be used either alone or in conjunction with any embodiments described above.

In a first example, a special or reserved identifier value is employed to mask the PCS when the PAN field included in the radio block and the special or reserved identifier value is used for control purposes. For example, this special or reserved value indicated through the PCS may indicate reset of certain positive acknowledgement (ACK) windows, or it may indicate information pertaining to RLC/MAC protocol information, such as transmit and receive state arrays V(A), V(B), or similar.

In a second example, a special or reserved identifier value is employed to mask the PCS when the received PAN is to be decoded by more than one receiving station, (such as in the case of time-based PAN encoding), and where the payload of the PAN contains information possibly pertaining to more than one (1) receiving station.

In a third example, a special or reserved identifier value is used to mask the PCS in order to simplify decoding at the receiving station, such as when the occurrence of the PAN and its association with data units (or PDUs) of a TBF is un-ambiguously tied to or determined from context by the intended receiver. For example, the special or reserved value may be used in the UL when transmitting to the network, because a single WTRU is usually un-ambiguously associated with a transmission opportunity in the UL timeslots through the uplink state flag (USF) assignment procedure under control by the network and when a WTRU is not assigned more than one (1) TBF in the UL.

More than one special or reserved value may be used in the system. The receiving station (WTRU or network) may implement a procedure where decoding of received PANs is configured in a flexible manner, depending on received system setup or configuration messages. In one case, the receiving station may decode the PAN against either one (1) or more special or reserved identifiers only. In another case, the receiving station may decode the PAN against one (1) or more assigned TFI(s) only. In yet another case, the receiving station may decode the PAN against either one or more special or reserved values while simultaneously attempting to decode against one or more assigned TFIs.

The special or reserved value may be a reserved TBF code, e.g. TFI value. For example, all bits of the TFI used to mask the PCS generated from the PAN field may be set to '0s' in order to indicate the special or reserved value. As is obvious to one skilled in the art, other possible choices than an all-zero sequence are equally possible and equivalent, as long as there is no other TFI value assigned to a TBF on at least the assigned set of resources (PDCH(s), or timeslot(s), or WTRUs, or receiver(s)). Alternatively, the special or reserved value to mask the PCS on the PAN field may always be the same, either in the GSM/(E)GPRS system, a group of cells, a cell, set of resources (PDCH), or it may be assigned on a semi-static basic, such as signaling or configuration and set-up messages to either one or more receiving stations.

Alternatively, the special or reserved value may be realized as another separate PAN field entry or as a bit or bit field or as a code point of any entry in an RLC/MAC data or control block. For example, the special or reserved value may be an entry in the RLC/MAC header, or it may be a bit set in the PAN field.

Upon detection of the special or reserved value, the receiving station(s) may perform an action indicated by the special value. One example for such action is to decode and process the PAN field according to rules specific to the context of the use of the special or reserved value, like decoding of the PAN field according to the bitmap in interpretation of time-based PAN encoding. Alternatively, the special or reserved value is employed to simplify the PAN encoding and/or decoding procedure for the PCS in the transmitting stations and/or receiving stations in order to avoid implementation of more than one PAN processing units or constituting components thereof. For example, when a first implementation sequence is used to mask the PCS with a regular assigned TFI (corresponding to an assigned TBF), and a second implementation sequence is used to mask the PCS in the case of no TFI associated with the PAN transmission and its contents. Using such a special or reserved value to mask the PCS for the second implementation sequence makes it possible to employ the first implementation sequence even in the case of no TFI associated with the PAN. In the latter case, using the sequence of bits set to '0' for the masking TFI, the computed PCS corresponds to the constituting CRC. Even in the case where the special or reserved identifier is a different sequence, implementation of the second implementation sequence is still not required, because a simple bit reversal procedure can be used to align it with the first implementation sequence.

Although features and elements are described above in particular combinations, each feature or element can be used alone without the other features and elements or in various combinations with or without other features and elements. The methods or flow charts provided herein may be implemented in a computer program, software, or firmware incorporated in a computer-readable storage medium for execution by a general purpose computer or a processor. Examples of computer-readable storage mediums include a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs).

Suitable processors include, by way of example, a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Arrays (FPGAs) circuits, any other type of integrated circuit (IC), and/or a state machine.

A processor in association with software may be used to implement a radio frequency transceiver for use in a wireless transmit receive unit (WTRU), user equipment (UE), terminal, base station, radio network controller (RNC), or any host computer. The WTRU may be used in conjunction with modules, implemented in hardware and/or software, such as a camera, a video camera module, a videophone, a speakerphone, a vibration device, a speaker, a microphone, a television transceiver, a hands free headset, a keyboard, a Bluetooth® module, a frequency modulated (FM) radio unit, a liquid crystal display (LCD) display unit, an organic light-emitting diode (OLED) display unit, a digital music player, a media player, a video game player module, an Internet browser, and/or any wireless local area network (WLAN) or Ultra Wide Band (UWB) module.

What is claimed is:

1. A method for use in a wireless transmit/receive unit (WTRU), the method comprising:
the WTRU generating a piggybacked acknowledgement/non-acknowledgement (PAN) field;
the WTRU generating a PAN check sequence (PCS) from the PAN field;
the WTRU masking the PCS with a temporary flow identity (TFI) value that consists of five bits, wherein, based on a pre-determined condition, the TFI value is not associated with an address and each of the five bits has a value of zero; and
the WTRU transmitting data that includes the PAN field and the masked PCS.

2. The method of claim 1, wherein the masking the PCS further comprises adding the TFI value modulo-2 to a last five bits of the PCS.

3. The method of claim 1, wherein the pre-determined condition is the WTRU being assigned one temporary block flow (TBF) in the uplink direction.

4. The method of claim 1, wherein the pre-determined condition is an action affecting the WTRU.

5. The method of claim 1, wherein the pre-determined condition is the PAN field needing to be decoded by more than one WTRU.

6. A method for use in a base station, the method comprising:
the base station receiving data that includes a piggybacked acknowledgement/non-acknowledgment (PAN) field and a masked PAN check sequence (PCS), the masked PCS being masked by a PCS generated from the PAN field with a temporary flow identity (TFI) value that consists of five bits, wherein, based on a pre-determined condition, the TFI value is not associated with an address and each of the five bits has a value of zero; and
the base station decoding the masked PCS using the TFI value.

7. The method of claim 6, wherein the pre-determined condition is a particular receiving station being assigned one temporary block flow (TBF) in the uplink direction.

8. The method of claim 6, wherein the pre-determined condition is an action affecting a particular receiving station.

9. The method of claim 6, wherein the pre-determined condition is the PAN field needing to be decoded by more than one receiving station.

10. A wireless transmit/receive unit (WTRU) comprising:
a processor configured to:
generate a piggybacked acknowledgement/non-acknowledgement (PAN) field;
generate a PAN check sequence (PCS) from the PAN field; and
mask the PCS with a temporary flow identity (TFI) value that consists of five bits, wherein, based on a pre-determined condition, the TFI value is not associated with an address and each of the five bits has a value of zero; and
a transmitter configured to transmit data that includes the PAN field and the masked PCS.

11. The WTRU of claim 10, wherein the processor is further configured to mask the PCS by adding the TFI value modulo-2 to a last five bits of the PCS.

12. The WTRU of claim 10, wherein the pre-determined condition is the WTRU being assigned one temporary block flow (TBF) in the uplink direction.

13. The WTRU of claim 10, wherein the pre-determined condition is an action affecting the WTRU.

14. The WTRU of claim 10, wherein the pre-determined condition is the PAN field needing to be decoded by more than one WTRU.

15. A base station comprising:
a receiver configured to receive data that includes a piggybacked acknowledgement/non-acknowledgment (PAN) field and a masked PAN check sequence (PCS), the masked PCS being masked by a PCS generated from the PAN field with a temporary flow identity (TFI) value that consists of five bits, wherein, based on a pre-determined condition, the TFI value is not associated with an address and each of the five bits has a value of zero; and
a processor configured to decode the masked PCS using the TFI value.

16. The base station of claim 15, wherein the pre-determined condition is a particular receiving station being assigned one temporary block flow (TBF) in the uplink direction.

17. The base station of claim 15, wherein the pre-determined condition is an action affecting a particular receiving station.

18. The base station of claim 15, wherein the pre-determined condition is the PAN field needing to be decoded by more than one receiving station.

* * * * *